United States Patent
Dutta et al.

(10) Patent No.: US 8,688,647 B2
(45) Date of Patent: Apr. 1, 2014

(54) SYSTEM, METHOD AND COMPUTER PROGRAM PRODUCT FOR CALCULATING A SIZE OF AN ENTITY

(75) Inventors: Arup Dutta, San Ramon, CA (US); Caroline Modic, Berkeley, CA (US); Dan Soble, Pleasanton, CA (US)

(73) Assignee: salesforce.com, inc., San Francisco, CA (US)

( * ) Notice: Subject to any disclaimer, the term of this patent is extended or adjusted under 35 U.S.C. 154(b) by 1 day.

(21) Appl. No.: 13/287,067

(22) Filed: Nov. 1, 2011

(65) Prior Publication Data

US 2013/0054637 A1  Feb. 28, 2013

Related U.S. Application Data

(60) Provisional application No. 61/527,521, filed on Aug. 25, 2011.

(51) Int. Cl.
*G06F 7/00* (2006.01)
*G06F 17/30* (2006.01)

(52) U.S. Cl.
USPC .......................... 707/688; 707/696; 707/713

(58) Field of Classification Search
None
See application file for complete search history.

(56) References Cited

U.S. PATENT DOCUMENTS

| | | | |
|---|---|---|---|
| 7,209,929 B2 | 4/2007 | Dominguez, Jr. et al. | |
| 7,698,160 B2 | 4/2010 | Beaven et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 2003/0233404 A1 | 12/2003 | Hopkins | |
| 2005/0065925 A1* | 3/2005 | Weissman et al. | 707/4 |
| 2005/0165794 A1* | 7/2005 | Mosescu | 707/100 |
| 2005/0223022 A1 | 10/2005 | Weissman et al. | |
| 2005/0283478 A1 | 12/2005 | Choi et al. | |
| 2006/0206834 A1 | 9/2006 | Fisher et al. | |

OTHER PUBLICATIONS

U.S. Appl. No. 60/828,192, filed Oct. 4, 2006.

* cited by examiner

*Primary Examiner* — Sangwoo Ahn
(74) *Attorney, Agent, or Firm* — Zilka-Kotab, PC

(57) ABSTRACT

In accordance with embodiments, there are provided mechanisms and methods for calculating a size of an entity. These mechanisms and methods for calculating a size of an entity can enable optimized data analysis, improved system resource knowledge, increased efficiency, etc.

17 Claims, 4 Drawing Sheets

SYSTEM, METHOD AND COMPUTER PROGRAM PRODUCT FOR CALCULATING A SIZE OF AN ENTITY

CLAIM OF PRIORITY

This application claims the benefit of U.S. Provisional Patent Application 61/527,521, entitled "Methods and Systems for Determining the Size of an Organization in an On-Demand Service Environment," by Dutta et al., filed Aug. 25, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to data storage, and more particularly to measuring usage of data storage.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Many modern systems provide storage services to one or more entities. For example, data associated with one or more entities may be stored within the system. Unfortunately, techniques for determining an amount of storage that is utilized by one or more of the entities have been associated with various limitations.

Just by way of example, there are currently no means by which a system can determine a size of an entity within the system (e.g., an amount of storage within the system that is utilized by a particular entity, etc.). Accordingly, it is desirable to provide techniques that allow for a determination of a size of an entity within a system.

BRIEF SUMMARY

In accordance with embodiments, there are provided mechanisms and methods for calculating a size of an entity. These mechanisms and methods for calculating a size of an entity can enable optimized data analysis, improved system resource knowledge, increased efficiency, etc.

In an embodiment and by way of example, a method for calculating a size of an entity is provided. In one embodiment, an entity is identified. Additionally, one or more indexes associated with the entity are determined. Further, a size of the entity is calculated, based on the one or more indexes.

While one or more implementations and techniques are described with reference to an embodiment in which calculating a size of an entity is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for calculating a size of an entity.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for calculating a size of an entity will be described with reference to example embodiments.

Figure 1:
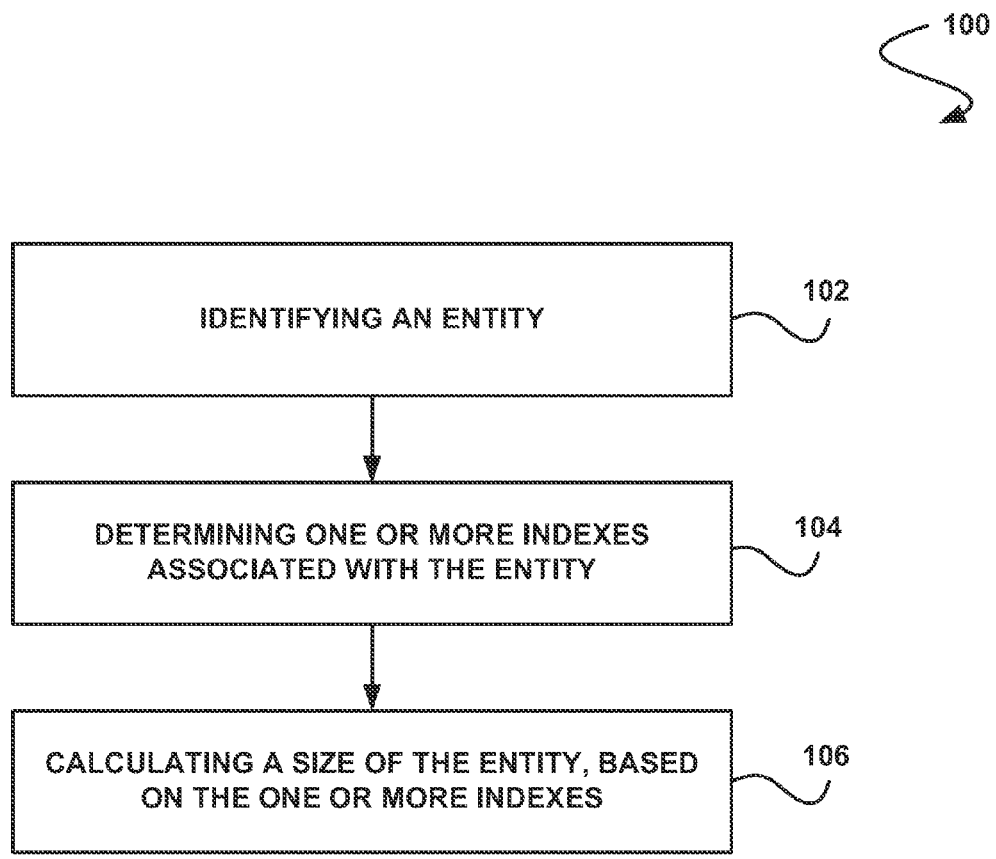
FIG. 1 illustrates a method for calculating a size of an entity, in accordance with one embodiment.

FIG. 1 illustrates a method 100 for calculating a size of an entity, in accordance with one embodiment. As shown in operation 102, an entity is identified. In one embodiment, the entity may be associated with a system. For example, the entity may be implemented within a server, client, a multi-tenant on-demand database system, etc. In another embodiment, the entity may include a client of the system. For example, the entity may include a customer of the system, a tenant of the system, an organization created within the system, etc. In yet another embodiment, the entity may be associated within a larger entity of the system. For example, one or more entities may be included within a tenant of the system.

In still another embodiment, the entity may include a standard entity. For example, the entity may include an entity created utilizing a standard template provided by the system. In another embodiment, the entity may include a custom entity. For example, the entity may include an entity created in a custom manner (e.g., without using a template provided by the system, etc.).

Additionally, in one embodiment, the entity may be identified by receiving input from a user. For example, a user of the system may select the entity within a page provided by the system (e.g., a black tab page, etc.). In another embodiment, the entity may be identified utilizing an identifier of the entity. For example, the entity may be identified utilizing an entity identifier (ID), entity number, etc. In yet another embodiment, the entity may be identified in response to a request for data associated with the entity. For example, the entity may be identified in response to a request for details regarding an amount of storage consumed by the entity.

Additionally, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Further, as shown in operation 104, one or more indexes associated with the entity are determined. In one embodiment, determining the one or more indexes may include retrieving a list of all indexes associated with the entity (e.g., database indexes, custom indexes, etc.). For example, determining the one or more indexes may include retrieving a list of all indexes used by the entity within the system. In another embodiment, the one or more indexes may be determined utilizing structured query language (SQL) code. For example, determining the one or more indexes may include requesting index details from the system using SQL code. In yet another embodiment, the one or more indexes may be labeled. For example, the one or more indexes may each have an associated name (e.g., an index name, etc.).

Further still, in one embodiment, the one or more indexes associated with the entity may be associated with a list. For example, the one or more indexes associated with the entity may be listed and/or described in a list of a data dictionary (e.g., a universal data dictionary (MD), etc.). In another embodiment, determining the one or more indexes may include traversing the list. In yet another embodiment, the one or more indexes may include one or more standard indexes. For example, the one or more indexes may include one or more indexes having a predetermined layout that are used by a standard entity, shared by one or more entities, etc. In another embodiment, the one or more indexes may include one or more custom indexes. For example, the one or more indexes may include one or more indexes having a custom layout that are used by a custom entity. In still another embodiment, the one or more indexes may include one or more tables.

Also, as shown in operation 106, a size of the entity is calculated, based on the one or more indexes. In one embodiment, the size of the entity may include an amount of data used by the entity within the system. For example, the size of the entity may include an amount of storage (e.g., database storage, disk storage, etc.) that is consumed by the entity. In another embodiment, calculating the size of the entity may include generating code to determine information associated with the one or more indexes. For example, calculating the size of the entity may include dynamically generating SQL code to determine a size of the data within the one or more indexes.

In addition, in one embodiment, the size of the entity may be reported to a user. For example, a report may be created that includes the size of the entity, and such report may be distributed to the user (e.g., via an electronic mail message, a streaming message feed, a web page, etc.). In another embodiment, a detailed breakdown of the size of the entity may be reported to the user. For example, the report sent to the user may include the size of each index associated with the entity.

Figure 2:
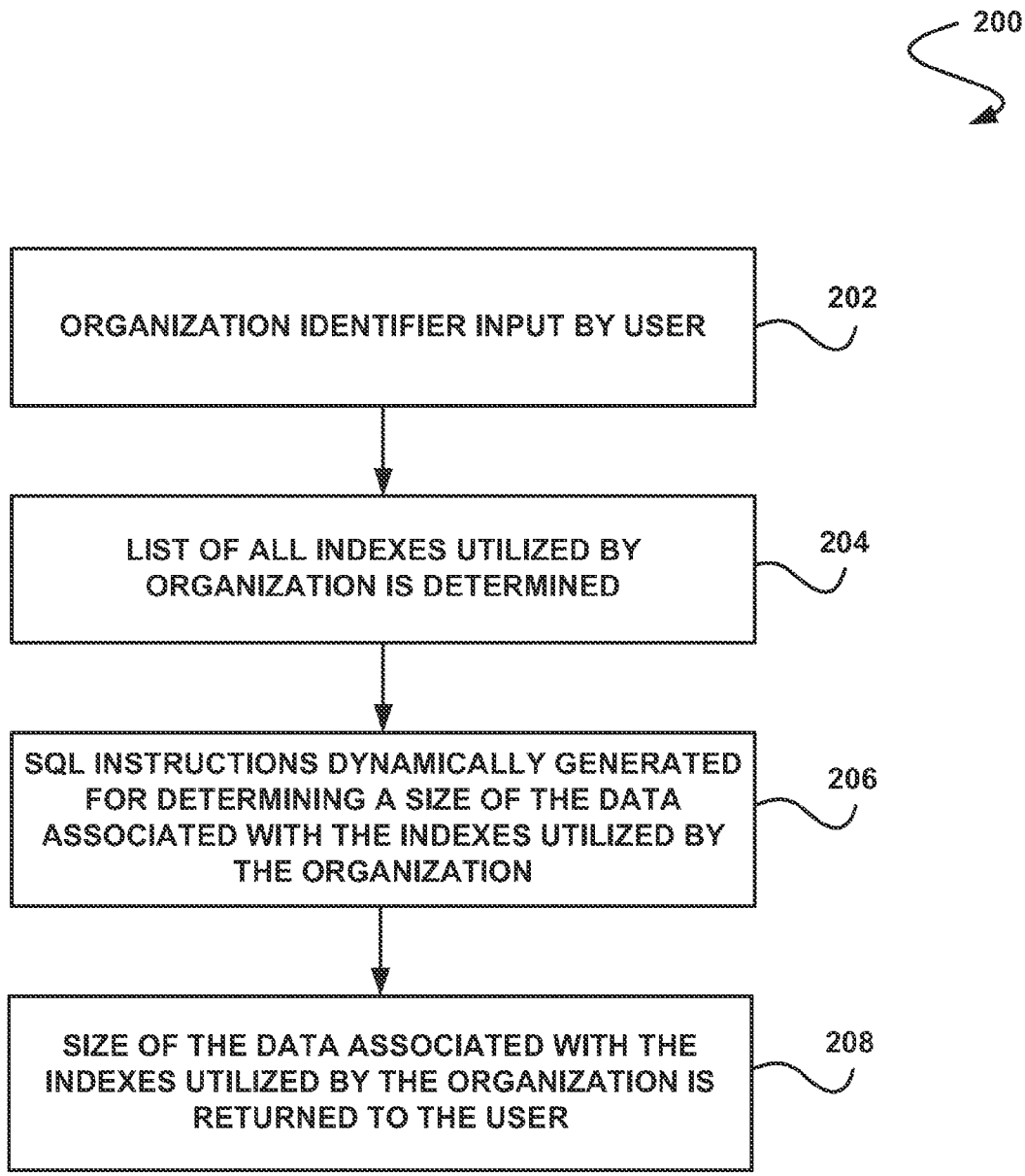
FIG. 2 illustrates a method for reporting database storage consumed by an organization, in accordance with another embodiment.

FIG. 2 illustrates a method 200 for reporting database storage consumed by an organization, in accordance with another embodiment. As an option, the present method 200 may be carried out in the context of the functionality of FIG. 1. Of course, however, the method 200 may be carried out in any desired environment. The aforementioned definitions may apply during the present description.

As shown in operation 202, an organization identifier (ID) is input by a user. In one embodiment, the organization ID may be input by the user utilizing a graphical user interface (GUI), a web page, a command prompt, etc. In another embodiment, a black tab page may be provided with the organization ID as input, where one or more options may be available as checkboxes for selection by the user, such as "standard entities," "custom entities," "skinny tables," "standard indexes," "file storage," etc. In another embodiment, the one or more options may be associated with the type of information requested by the user, the entities and tables to be considered by the system during the reporting of database storage, etc. In yet another embodiment, a request to calculate storage that includes the organization ID may be sent to a message queue and processed by a message queue handler.

Additionally, as shown in operation 204, a list of all indexes utilized by an organization is determined. In one embodiment, the organization may be the organization identified by the organization ID. In another embodiment, the list of all indexes utilized by the organization may be determined by accessing a UDD that describes all indexes within a system. For example, the UDD may be traversed and each index within the UDD that is associated with the organization may be identified. In yet another embodiment, the list of all indexes may be determined utilizing SQL code. For example, SQL code may be created that accesses the UDD and determines all indexes utilized by the organization.

Further, as shown in operation 206, SQL instructions are dynamically generated for determining a size of the data associated with the indexes utilized by the organization. In one embodiment, the SQL instructions may be generated for each index determined to be utilized by the organization. In another embodiment, the SQL instructions may determine a size of data within columns of an index.

Further still, in one embodiment, for standard organizations, dynamically generating the instructions may include looping through the list of all indexes utilized by the organization and dynamically generating SQL code that utilizes a vsize function for all columns of each index. In another embodiment, for custom organizations and custom indexes, dynamically generating the instructions may include dynamically generating SQL code that utilizes a vsize function for all columns of each index defined in custom metadata associated with the custom organization.

Also, in one embodiment, a small sample of each of the indexes may be utilized by the SQL instructions. For example, a sample clause of each of the indexes (e.g., representing five percent of the total index, ten percent of the total index, fifteen percent of the total index, etc.) may be used by the SQL instructions to estimate a total size of the index. In another embodiment, SQL code may be dynamically generated that utilizes a vsize function for all columns of each index within the sample clause. In yet another embodiment, storage counts may be used at a later date to provide another estimate of the sample. In this way, the size returned by the sample clause may be used to estimate the total size of the data associated with the indexes utilized by the organization. In still another embodiment, for a skinny table (e.g., denormalized table created by combining all information from related tables about one entity into a single table, etc.), dynamically generating the instructions may include dynamically generating SQL code that queries a table (e.g. "core.skinny_table," etc.) and retrieves a list of skinny table names, where for each skinny table storage may be computed by generating the SQL code with a vsize function for all columns of the table with the sample clause.

In addition, in one embodiment, the SQL instructions may select a sum of a calculated vsize for all non compressed columns for an index, and just a vsize for all compressed columns for an index. In another embodiment, the SQL instructions may include instructions for grouping the results of the SQL query by the compressed columns. In yet another embodiment, the SQL instructions may hint the query with an index name with a sample clause to instruct the system to use the particular index. In still another embodiment, the SQL instructions may include instructions for filtering the results of the SQL query. For example, the SQL instructions may include instructions for filtering the results of the SQL query by the organization ID.

Table 1 illustrates exemplary SQL code for retrieving a list of indexes, in addition to index details, for an organization named "CORE.CUSTOM_ENTITY_DATA." Of course, it should be noted that the code shown in Table 1 is set forth for illustrative purposes only, and thus should not be construed as limiting in any manner.

TABLE 1

SELECT indx.index_name, icol.column_name, icol.column_position,
  icol.descend, indx.prefix_length, indx.compression
FROM dba_indexes indx, dba_ind_columns icol
WHERE indx.table_owner='CORE' AND
  indx.table_name='CUSTOM_ENTITY_DATA' AND
  indx.table_name=icol.table_name AND
  indx.index_name=icol.index_name AND
  indx.table_owner=icol.table_owner
ORDER BY icol.index_name, icol.column_position;

Table 2 illustrates exemplary results of running the SQL code in Table 1 for retrieving index details for the organization named "CORE.CUSTOM_ENTITY_DATA." Of course, it should be noted that the results shown in Table 2 are set forth for illustrative purposes only, and thus should not be construed as limiting in any manner.

TABLE 2

| INDEX_NAME | COLUMN_NAME | COLUMN_POSITION | DESC | PREFIX_LENGTH | COMPRESS |
|---|---|---|---|---|---|
| IECUSTOM_ENTITY_DATA_CREATED | ORGANIZATION_ID | 1 | ASC | 2 | ENABLED |
| IECUSTOM_ENTITY_DATA_CREATED | KEY_PREFIX | 2 | ASC | 2 | ENABLED |
| IECUSTOM_ENTITY_DATA_CREATED | CREATED_DATE | 3 | ASC | 2 | ENABLED |
| IECUSTOM_ENTITY_DATA_CREATED | DELETED | 4 | ASC | 2 | ENABLED |

As shown in Table 2, details for "IECUSTOM_ENTITY_DATA_CREATED" added, and for index "IECUSTOM_ENTITY_DATA_CREATED," columns "ORGANIZATION_ID" and "KEY_PREFIX" may be compressed (for example, by using the following code: "prefix_length:2"). In this way, a list of all entities of an organization may be retrieved.

Table 3 illustrates exemplary SQL code for computing a storage size for the index "IECUSTOM_ENTITY_DATA_CREATED" (as shown in Table 2). Of course, it should be noted that the code shown in Table 3 is set forth for illustrative purposes only, and thus should not be construed as limiting in any manner.

TABLE 3

SELECT SUM(val) FROM (
SELECT /*+ use_index(IECUSTOM_ENTITY_DATA_CREATED) */
SUM(VSIZE(created_date)) + SUM(VSIZE(deleted)) +
VSIZE(organization_id) + VSIZE(key_prefix) AS val
FROM core.custom_entity_data
WHERE organization_id = '00Dx00000000TwE'
GROUP BY organization_id, key_prefix
)

As shown in Table 3, the results of the storage size computation are filtered by the organization ID "00Dx00000000TwE."

Table 4 illustrates exemplary results showing the SQL plan for the SQL code in Table 3 for computing storage size for the index "IECUSTOM_ENTITY_DATA_CREATED." Of course, it should be noted that the results shown in Table 4 are set forth for illustrative purposes only, and thus should not be construed as limiting in any manner.

TABLE 4

| Id | Operation | Name | Rows | Bytes | Cost (% CPU) | Time | Pstart | Pstop |
|---|---|---|---|---|---|---|---|---|
| 0 | SELECT STATEMENT | | 1 | 13 | 20 (5) | 00:00:01 | | |
| 1 | SORT AGGREGATE | | 1 | 13 | | | | |
| 2 | VIEW | | 4 | 52 | 20 (5) | 00:00:01 | | |
| 3 | SORT GROUP BY NOSORT | | 4 | 120 | 20 (5) | 00:00:01 | | |
| 4 | PARTITION HASH SINGLE | | 5187 | 151K | 19 (0) | 00:00:01 | 1 | 1 |
| * 5 | INDEX RANGE SCAN | IECUSTOM_ENTITY_DATA_CREATED | 5187 | 151K | 19 (0) | 00:00:01 | 1 | 1 |

As illustrated in Table 4, the SQL plan shows the index being used. Additionally, Table 5 illustrates exemplary predicate information associated with the results of running the SQL code in Table 3. Of course, it should be noted that the information shown in Table 5 is set forth for illustrative purposes only, and thus should not be construed as limiting in any manner.

TABLE 5

5 - access("ORGANIZATION_ID"='00Dx00000000TwE')
17 rows selected.

Additionally, as shown in operation 208, the size of the data associated with the indexes utilized by the organization is returned to the user. In one embodiment, a report with storage details consumed by the organization may be sent to the user (e.g., via an electronic mail message, an instant message, a web page, etc.). In another embodiment, the report may report a single overall number indicating the size of the data, and may also provide a detailed view that may report by table, by index, etc.

Further, in one embodiment, storage consumed by the organization in areas other than the indexes (e.g., non database storage, etc.) may be determined, and SQL instructions may be dynamically generated for determining a size of the data associated with the other areas utilized by the organization. In another embodiment, the size of the data associated with the indexes utilized by the organization may be reported according to a predetermined schedule (e.g., on a weekly basis, etc.), and such information may be persisted in one or more databases. In this way, organization storage growth, index growth, etc. may be identified over a period of time. Additionally, trends associated with one or more organizations may be identified through such reports. Further, storage issues associated with organization database usage may be forecast, predicted, etc. Further still, services may be metered based on the reports, billing may be adjusted based on the reports, etc.

System Overview

Figure 3:
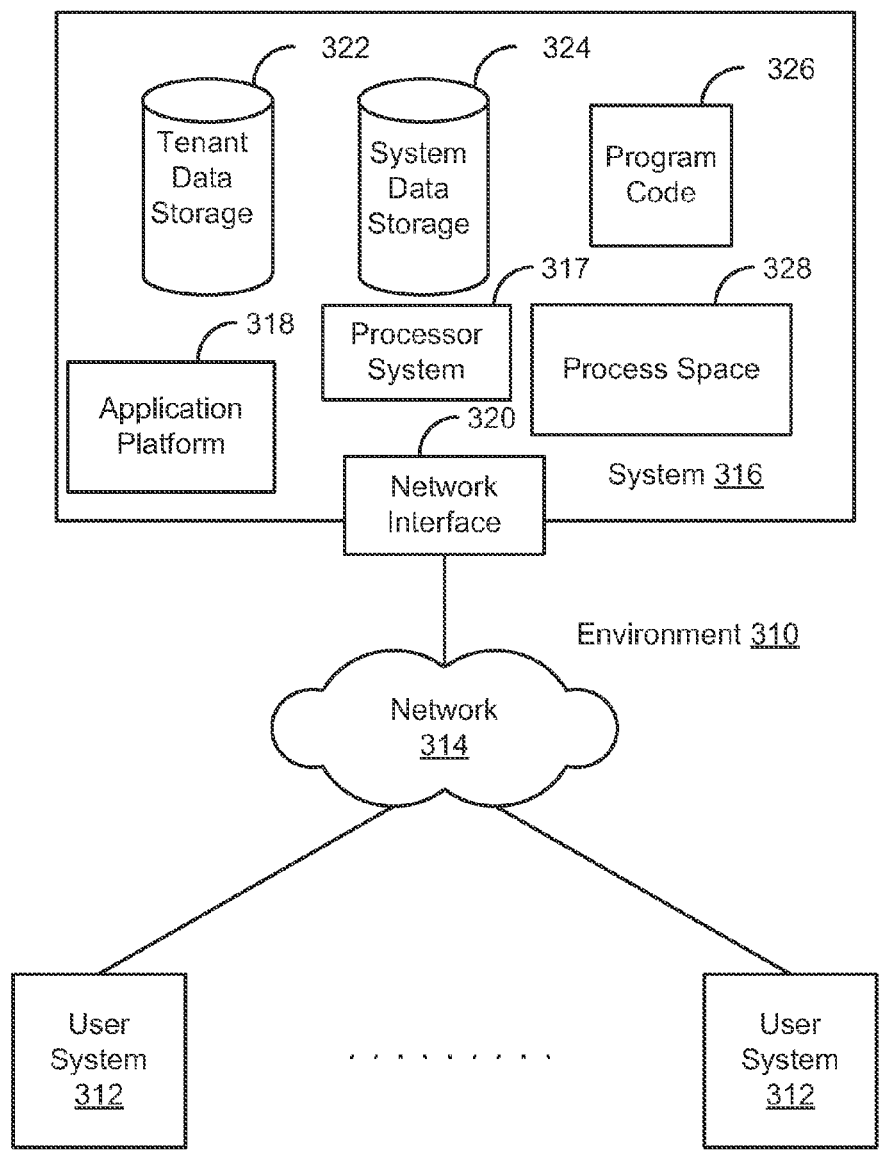
FIG. 3 illustrates a block diagram of an example of an environment wherein an on-demand database system might be used.

FIG. 3 illustrates a block diagram of an environment 310 wherein an on-demand database system might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database system exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database system, which is system 316.

An on-demand database system, such as system 316, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database system 316 may include an application platform 318 that enables creation, managing and executing one or more applications developed by the provider of the on-demand database system, users accessing the on-demand database system via user systems 312, or third party application developers accessing the on-demand database system via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAR-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
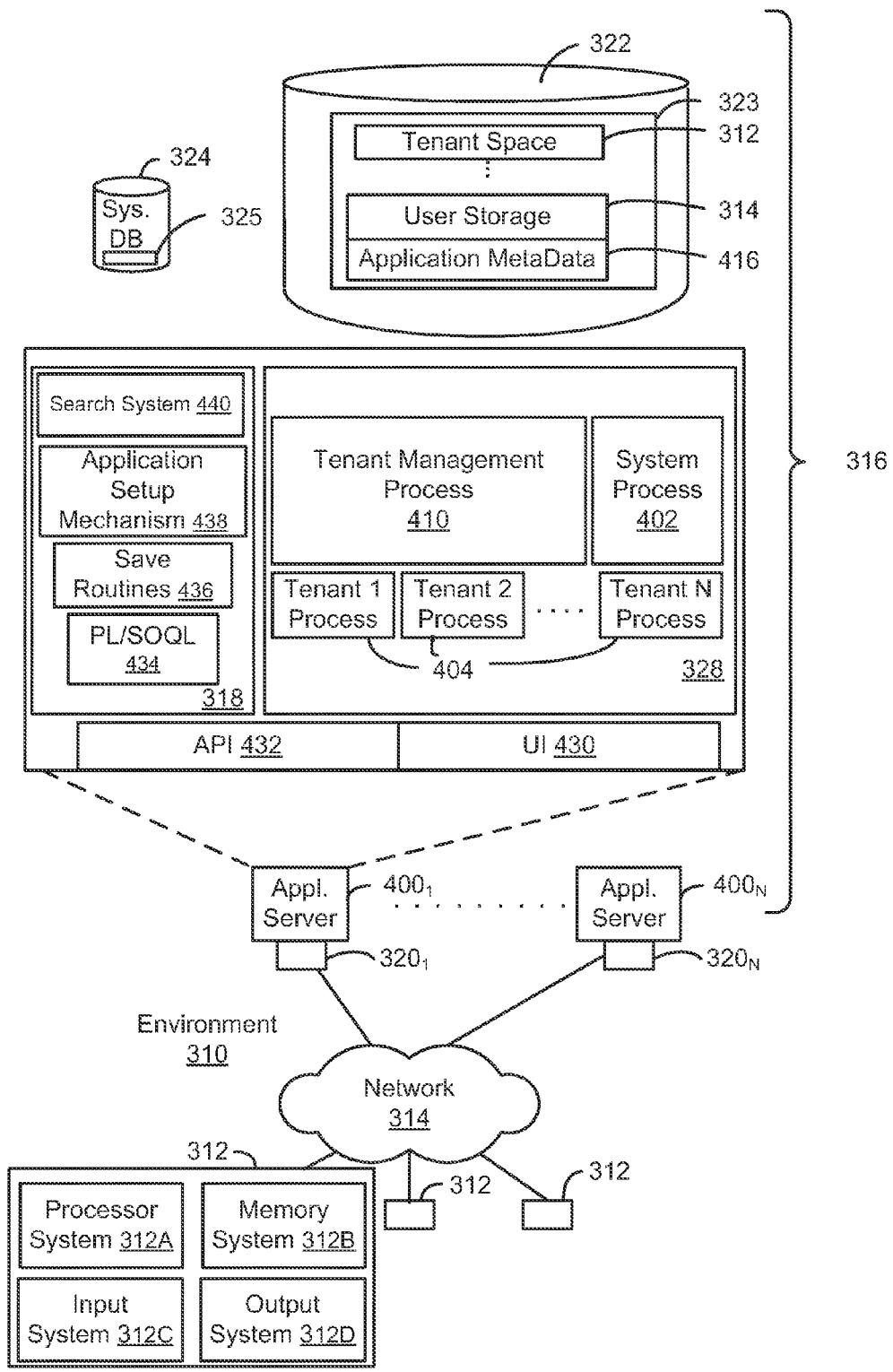
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325. User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL, language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

in certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product embodied on a non-transitory computer readable medium, comprising:
   computer code for identifying an entity implemented within a multi-tenant on-demand database system, where the entity includes a tenant of the system;
   computer code for determining one or more indexes associated with the entity; and
   computer code for calculating a size of the entity including an amount of storage consumed by the entity by:
      selecting a sample clause representing a portion of the one or more indexes associated with the entity;
      dynamically generating structured query language (SQL) instructions for all columns of each index within the sample clause to determine a sample size of data in bytes within the columns of the sample clause, where the SQL instructions utilize a vsize function for all columns of each index within the sample clause to determine a size of data in bytes within the columns of the sample clause; and
      estimating, using the sample size, a total size of data within all of the indexes associated with the entity.

2. The computer program product of claim 1, wherein the entity is identified by receiving input from a user.

3. The computer program product of claim 1, wherein the entity is identified utilizing an entity identifier (ID).

4. The computer program product of claim 1, wherein the entity is identified in response to a request for data associated with the entity.

5. The computer program product of claim 1, wherein determining the one or more indexes includes retrieving a list of all indexes associated with the entity.

6. The computer program product of claim 1, wherein determining the one or more indexes may include requesting index details from the system using structured query language (SQL) code.

7. The computer program product of claim 1, wherein the one or more indexes associated with the entity are described in a list of a data dictionary.

8. The computer program product of claim 1, wherein the one or more indexes include one or more tables.

9. The computer program product of claim 1, wherein the size of the entity includes an amount of data used by the entity within a system.

10. The computer program product of claim 1, further comprising computer code for reporting the size of the entity to a user.

11. The computer program product of claim 10, wherein a report is created that includes the size of the entity, and such report is distributed to the user.

12. The computer program product of claim 11, wherein the report sent to the user includes a size of each index associated with the entity.

13. The computer program product of claim 1, wherein the one or more indexes include one or more custom indexes.

14. The computer program product of claim 4, wherein the entity is identified in response to a request for details regarding the amount of storage consumed by the entity.

15. The computer program product of claim 1, wherein generating SQL instructions for all columns of each index within the sample clause includes looping through a list of the one or more indexes within the sample clause and dynamically generating the SQL instructions for all columns of each index.

16. A method, comprising:
   identifying an entity implemented within a multi-tenant on-demand database system, where the entity includes a tenant of the system;
   determining one or more indexes associated with the entity, utilizing a processor; and
   calculating a size of the entity including an amount of storage consumed by the entity by:
      selecting a sample clause representing a portion of the one or more indexes associated with the entity;
      dynamically generating structured query language (SQL) instructions for all columns of each index within the sample clause to determine a sample size of data in bytes within the columns of the sample clause, where the SQL instructions utilize a vsize function for all columns of each index within the sample clause to determine a size of data in bytes within the columns of the sample clause; and
   estimating, using the sample size, a total size of data within all of the indexes associated with the entity.

17. An apparatus, comprising:
a processor for:
   identifying an entity implemented within a multi-tenant on-demand database system, where the entity includes a tenant of the system;
   determining one or more indexes associated with the entity; and
   calculating a size of the entity including an amount of storage consumed by the entity by:
      selecting a sample clause representing a portion of the one or more indexes associated with the entity;
      dynamically generating structured query language (SQL) instructions for all columns of each index within the sample clause to determine a sample size of data in bytes within the columns of the sample clause, where the SQL instructions utilize a vsize function for all columns of each index within the sample clause to determine a size of data in bytes within the columns of the sample clause; and
estimating, using the sample size, a total size of data within all of the indexes associated with the entity.

* * * * *